(12) United States Patent
Orton et al.

(10) Patent No.: US 7,605,112 B2
(45) Date of Patent: Oct. 20, 2009

(54) SHALE INHIBITION

(75) Inventors: Sarah Orton, Surrey (GB); Andrew Mint, Hampshire (GB); Robert Gibbison, Kent (GB)

(73) Assignee: ISP Investments Inc., Wilmington, DE (US)

( * ) Notice: Subject to any disclaimer, the term of this patent is extended or adjusted under 35 U.S.C. 154(b) by 436 days.

(21) Appl. No.: 11/266,787

(22) Filed: Nov. 4, 2005

(65) Prior Publication Data

US 2007/0105723 A1 May 10, 2007

(51) Int. Cl.
*C09K 8/12* (2006.01)
*E21B 7/00* (2006.01)
*E21B 21/00* (2006.01)
*B01F 3/12* (2006.01)

(52) U.S. Cl. .......................... 507/118; 175/65; 516/77; 507/119

(58) Field of Classification Search ................ 507/118, 507/119; 175/65; 516/77
See application file for complete search history.

(56) References Cited

U.S. PATENT DOCUMENTS 3,654,164 A * 4/1972 Sperry ................... 507/118
6,020,289 A * 2/2000 Dymond ................. 507/120
6,800,696 B2  10/2004 Saito
2005/0101512 A1* 5/2005 Shah et al. ............... 510/475

OTHER PUBLICATIONS

PCT, International Search Report, PCT/US2006/042647 (dated Apr. 25, 2007; published May 18, 2007).
PCT, International Preliminary Report on Patentability, PCT/US2006/042647 (May 15, 2008).
Clark, R.K., "Applications of Water-Soluble Polymers as Shale Stabilizers in Drilling Fluids," *Advances in Chemistry Series Water-Soluble Polymers Beauty with Performance*, American Chemical Society, Washington, D.C., pp. 171-181 (1986).

* cited by examiner

*Primary Examiner*—Timothy J. Kugel
(74) *Attorney, Agent, or Firm*—William J. Davis; Thompson Hine LLP

(57) ABSTRACT

A method of shale inhibition comprises adding a two-phase polymer system of a water soluble copolymer of vinyl pyrrolidone and dimethylaminopropyl methacrylamide and in-situ formed water-insoluble particles of said copolymer, or, alternatively, a water-soluble copolymer of methylvinyl ether and maleic anhydride, into a drilling well fluid under aqueous, high temperature, high salinity conditions.

2 Claims, No Drawings

SHALE INHIBITION

BACKGROUND OF THE INVENTION

Subterranean materials that swell or increase in volume when exposed to water are referred to as "shale". Shale is commonly encountered during the drilling of oil well bores and these cuttings can be problematic when it degrades into smaller particles. At the surface of the well bore larger drilled cuttings can be removed by solids control equipment, but shale particles traveling up the bore will degrade into smaller particles that may adversely affect the stability of the well bore.

By incorporating a shale inhibitor in the drilling fluid or "mud", the breakdown of shale cuttings into smaller particles can be prevented. Traditionally oil based materials have been used as drilling fluids, but environmental regulations have led to the use of aqueous fluids. To prevent adverse reactions of the aqueous drill fluids with shale, a shale inhibitor is used. A shale inhibitor minimizes tendency of shale to absorb water and degrade into small particles.

Accordingly, it is an object of this invention to provide a new and improved method of shale inhibition.

SUMMARY OF THE INVENTION

What is described herein is a method of shale inhibition comprising adding a two-phase polymer system of a water soluble copolymer of vinyl pyrrolidone and dimethylamino propyl methacrylamide and in-situ formed water-insoluble particles of said copolymer, or, alternatively, a water-soluble copolymer of methylvinyl ether and maleic anhydride, into a drilling well fluid under aqueous, high temperature, high salinity conditions.

DETAILED DESCRIPTION OF THE INVENTION

A 2-4 mm particle size London Clay was used as the test material. The salinity of the test fluid was controlled by adding 40 g of KCl to each 350 g of fluid. A conversion of "40 pounds per barrel (ppb) KCl" is recommended by The American Petroleum Institute.

To test a given polymer composition for its shale/cutting dispersion ability, the composition is hot rolled to the test temperature with sized clay typical of a geological area for oil exploration for a period of 16 hours. The salinity of the aqueous polymer solution is also controlled to meet the test requirements. The sized clay sample is then sieved, washed, dried and weighed. The recovered shale is reported as a percentage of the original weight. A good shale inhibitor is indicated by a high percentage recovery, i.e. it has prevented the clay from swelling and breaking down into smaller particles. A >90% recovery is considered an excellent value.

The experimental test procedure is based on The American Petroleum Institute's Recommended Practice 131/ISO 10416:2002.

This test involves the use of a hot roll oven such as supplied by Fann Instruments. This equipment can rotate a glass bottle containing a test fluid and clay at a selected speed and temperature. A standard bench top horizontal roller mixer was modified with an infrared light so that the desired temperature of the test was maintained throughout.

Procedure:
1. Prepare 400 g of the composition test solution (polymer solution) to be evaluated.
2. Weigh the required amount of polymer solution and water into a 500 ml glass bottle with lid.
3. Add 40 g of KCl and heat with stirring to 71° C.
4. Add 20 g of clay to the test fluid and record weight.
5. Screw on the bottle cap and shake the sample by hand for 10 seconds.
6. Place the bottle on the roller mixer at 20 rpm with the IR lamp and leave for 16 hours.
7. Remove from the mixer and allow to cool for 1 hour.
8. Pour the contents of the bottle into the 500 μm sieve, retaining the clay and disposing of the test fluid.
9. Rinse the bottle with water and pour onto the sieve until all the shale comes out of the bottle.
10. Wash the shale in the sieve by immersing in a tray of water.
11. Empty the shale onto a piece of polyester film and brush out the sieve to remove all of the shale.
12. Air dry on the film for 30 minutes and then transfer to a pre-weighed Petri dish.
13. Dry to a constant weight at 121° C. (250° F.).
14. Weigh the dried shale and report as a percentage of the original 20 g.
15.

$$\% \text{ Shale Recovered} = \frac{\text{Weight Recovered Shale}}{\text{Weight Original Shale}} \times 100$$

The control was 40 ppb KCl fluid with no shale inhibitor (A). The invention shale inhibitor materials are listed below as (B) and (C).

Test Fluids:
(A) 40 ppb KCl
(B) 3% v/v Setleze™ 3000, 40 ppb KCl
(C) 3% v/v Gantrez® AN-169 (10% aqueous solution), 40 ppb KCl.

The test compositions are given in Table 1 below.

TABLE 1

| | Composition | | |
|---|---|---|---|
| Component (g) | (A) | (B) | (C) |
| DI Water | 332.83 | 322.33 | 322.33 |
| KCl | 40.00 | 40.00 | 40.00 |
| Setleze ™ 3000* | — | 10.77 | — |
| Gantrez ® An-169** (10% aqueous solution) | — | — | 10.68 |

*Setleze ™ 3000 (ISP) is vinyl pyrrolidone/dimethylaminopropyl methacrylamide copolymer, wt. ratio 80:20, a nonionic water-soluble copolymer matrix of VP/DMAPMA solution and a second phase of nano-particles neutralized with HCl (10% solution in water) U.S. Pat. 6,548,597, Ex. 1)
**Gantrez ® AN-169 (ISP) is methyl vinyl ether/maleic anhydride copolymer, a linear, alternating copolymer of MVE/MA supplied as a white, free-flowing hygroscopic powder The results are shown in Table 2 below.

TABLE 2

| Composition | % Recovery |
|---|---|
| A | 14.9 |
| B | 94.0 |
| C | 91.7 |

What is claimed is:

1. A method of shale inhibition comprising adding a composition comprising a two-phase polymer system of a water-soluble copolymer of vinyl pyrrolidone and dimethylamino propyl methacrylamide and in-situ formed water-insoluble particles of said copolymer, into a drilling well fluid under aqueous, saline conditions.

2. A method according to claim 1 wherein said composition provides a percentage recovery of >90% when tested in accordance with American Petroleum Institute's Recommended Practice 131/ISO 14016:2002.

* * * * *